J. C. Loveland,

Dough Kneader,

No. 2,265. Reissued June 5, 1866

Witnesses:

Jno. E. Lyon

Thos. Lusch.

Inventor,

J. C. Loveland

Munn & Co

Attorneys.

N. PETERS, PHOTO-LITHOGRAPHER, WASHINGTON, D. C.

UNITED STATES PATENT OFFICE

JOHN C. LOVELAND, OF SPRINGFIELD, VERMONT.

IMPROVED DOUGH-KNEADER.

Specification forming part of Letters Patent No. 52,062, dated January 16, 1866; Reissue No. 2,265, dated June 5, 1866.

*To all whom it may concern:*

Be it known that I, JOHN C. LOVELAND, of Springfield, Windsor county, State of Vermont, have invented a new and useful Improvement in Pastry-Kneader and Kitchen-Helper; and I do hereby declare that the following is a full, clear, and exact description thereof, which will enable others skilled in the art to make and use the same, reference being had to the accompanying drawings, forming part of this specification, in which—

Figure 1:
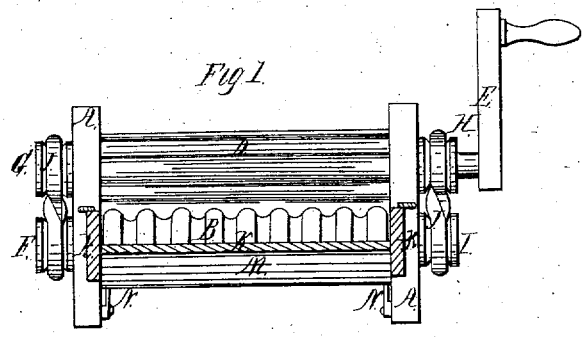
Figure 2:
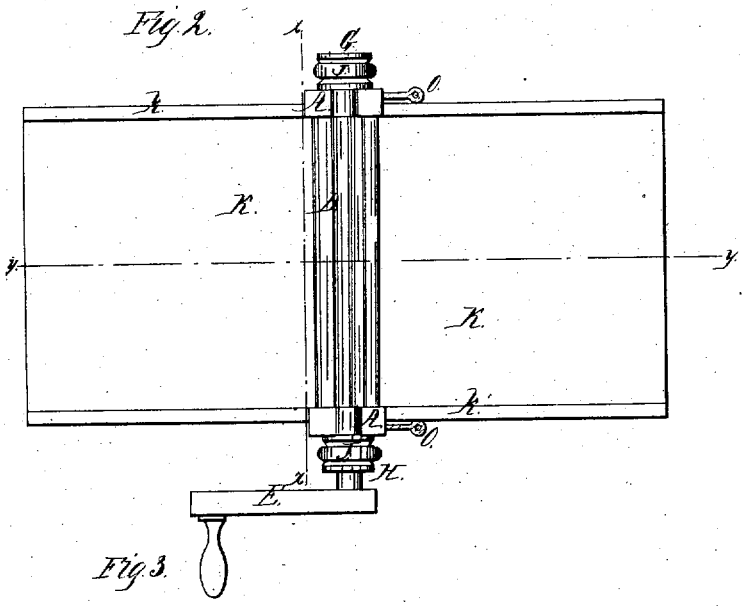
Figure 3:
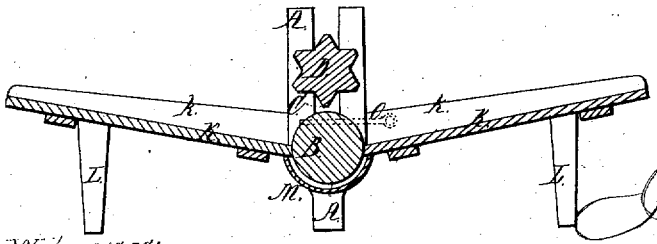

Figure 1 is a vertical cross-section of my improved kneader, taken through the line *x x*, Fig. 2. Fig. 2 is a top or plan view of the same. Fig. 3 is a vertical longitudinal section of the same, taken through the line *y y*, Fig. 2.

Similar letters of reference indicate like parts.

My invention has for its object to furnish a machine for kneading dough for pastry, bread, &c.; and it consists, first, in combining a pair of grooved, fluted, or irregular-surfaced rollers with each other and with the frame in which they work; second, in combining with said rollers and with the frame or supports of the machine a pair of inclined aprons or tables; third, in the combination, with the rollers, aprons, and supports or frame of the machine, of a dish for receiving the flour or dough that may be carried by the rollers to the under side of the table; fourth, in the use of fluted, grooved, or irregular-surfaced rollers for kneading dough; and fifth, in the use of rubber or other elastic bands for the purpose of obtaining a self-adjusting pressure upon the dough, as hereinafter more fully described.

A are the frames or supports in which are formed the bearings of the rollers and to which the lower or inner ends of the inclined tables or aprons are attached.

The upper part of the supports A are slotted, as represented in Figs. 1 and 2, and in the lower part of these slots revolve the journals of the roller B. Upon the journals of the roller B, within the slots of the supports A, are placed blocks, one of which is seen at C, Fig. 3. Upon the upper ends of said blocks C revolve the journals of the roller D, said blocks being so long as to keep the rollers B and D at any required distance apart. E is a crank attached to the projecting end of the axle of the roller D, and by which motion is communicated to the said roller D. Upon the ends of the axles of the rollers B and D are formed pulleys F G H I. The two pulleys at each side of the machine are connected by crossed rubber bands J, by which motion is communicated from the roller D to the roller B, and by which the pressure upon the dough may be made self-adjusting, the rollers being enabled to adjust themselves to the thickness of the mass of dough passing between them.

The roller D is grooved or channeled longitudinally, as shown, but the roller B is grooved or creased laterally, by which difference of form in the two rollers the dough is more thoroughly broken up and commingled or kneaded.

The same effect may be produced upon the dough by making the surfaces of the rollers irregular in other ways; but the manner described is the one which I prefer.

To the sides of the frame or supports A is attached the frame *k* of the tables or aprons K, the outer ends of said aprons being supported by felt L, attached to the frame-work *k* of said aprons.

For convenience, the aprons K are made slightly inclined toward the rollers, as shown in Fig. 3, and their lower edges are scalloped, so as to fit into the grooves or creases in the roller B. By this means a less amount of flour or dough will be able to find its way between the roller and aprons to the lower part of the machine; but whatever amount does find its way through is caught by the dish M, which is a dish made in the form represented in Fig. 3, placed beneath the roller B, its edges resting against the lower surface of the aprons, as shown, and its ends against the supports A; and it is held in place by the buttons N, attached to the supports A, and shutting up against the lower part of said dish, by turning which buttons the dish M may be removed and emptied as often as may be necessary.

In using the machine the dough to be kneaded is placed on one of the aprons K, a portion of the dough being in contact with the rollers B and D. Then by the revolution of the rollers the whole mass is drawn through between the rollers and deposited on the other apron. Then it may be doubled up, and by reversing the motion of the rollers it will be drawn back to the first apron, which operation should be continued until the dough has been thoroughly kneaded.

The elasticity of the bands J allows the space between the rollers to be increased when a thicker or stiffer portion of the dough is passing through.

It will be observed that the rollers are held in place by the pins O passing through the supports A and into the blocks G, these holes and pins being so arranged that the pins will fit whatever way the rollers may be placed in the slots. This allows the rollers to be attached to the machine with the crank on whichever side convenience may require.

By removing the corrugated rollers B and D, and substituting a pair of plain rollers, the machine may be used for rolling out pie-crust and other pastry that requires to be rolled into thin sheets, and by varying the length of the blocks C the thickness of the sheets of dough may be varied at pleasure.

I claim as new and desire to secure by Letters Patent—

1. The combination of the grooved, fluted, or irregular-surfaced rollers B and D, constructed substantially as described, with each other and with the frame A, in which they work, as and for the purpose herein set forth.

2. The combination, with the rollers B and D, and with the frame or supports A of the machine, of a pair of inclined aprons or tables K, substantially as described, and for the purpose set forth.

3. The combination of the dish M with the roller B, aprons K, and supports or frame A of the machine, substantially as described, and for the purpose set forth.

JOHN C. LOVELAND.

Witnesses:
HENRY CLOSSON,
LINA W. CLOSSON.